Dec. 8, 1959   J. GAMMACK   2,916,003
SEAPLANE BEACHING APPARATUS
Filed Sept. 11, 1957   3 Sheets-Sheet 1
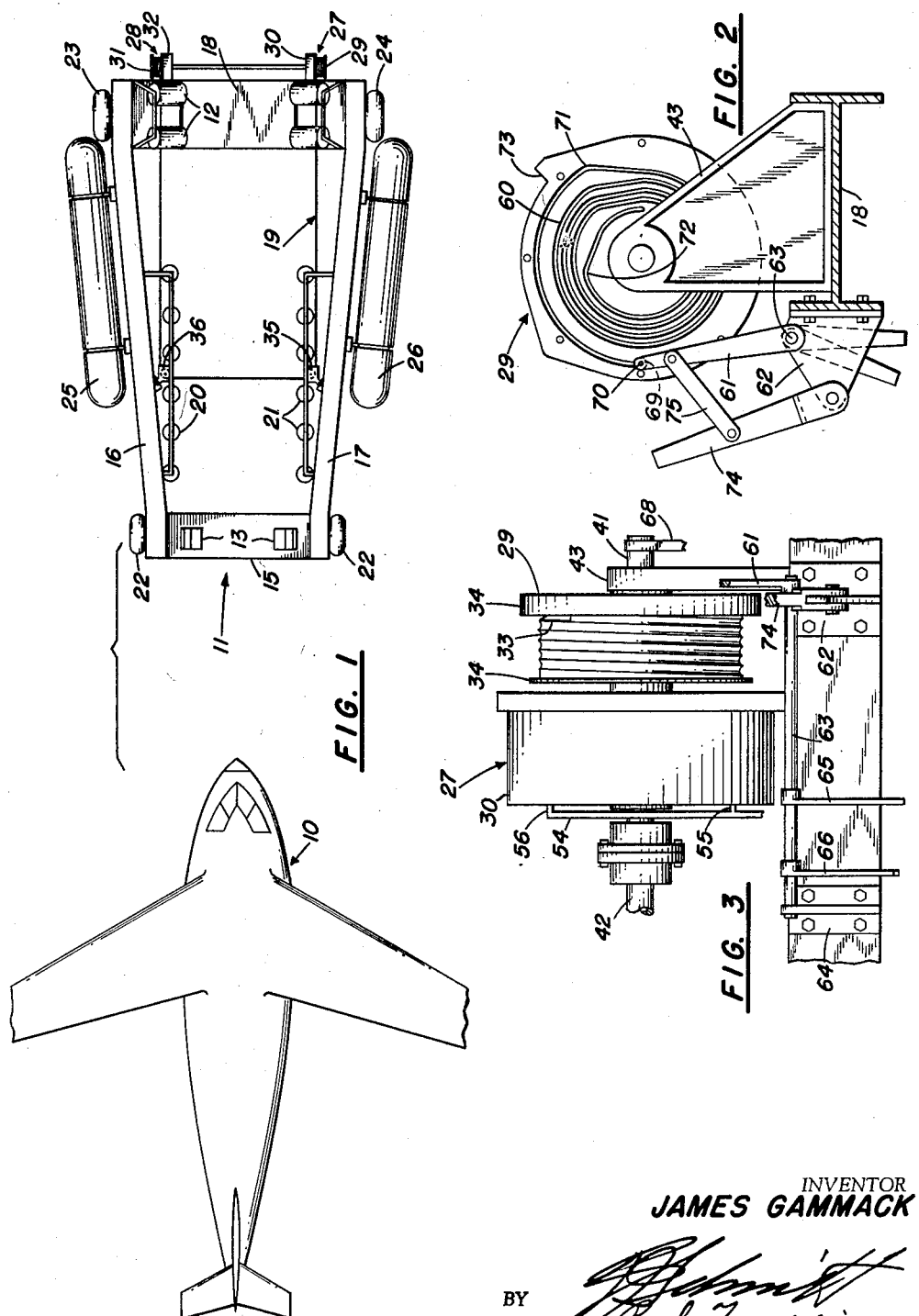
INVENTOR
JAMES GAMMACK
BY
ATTORNEYS

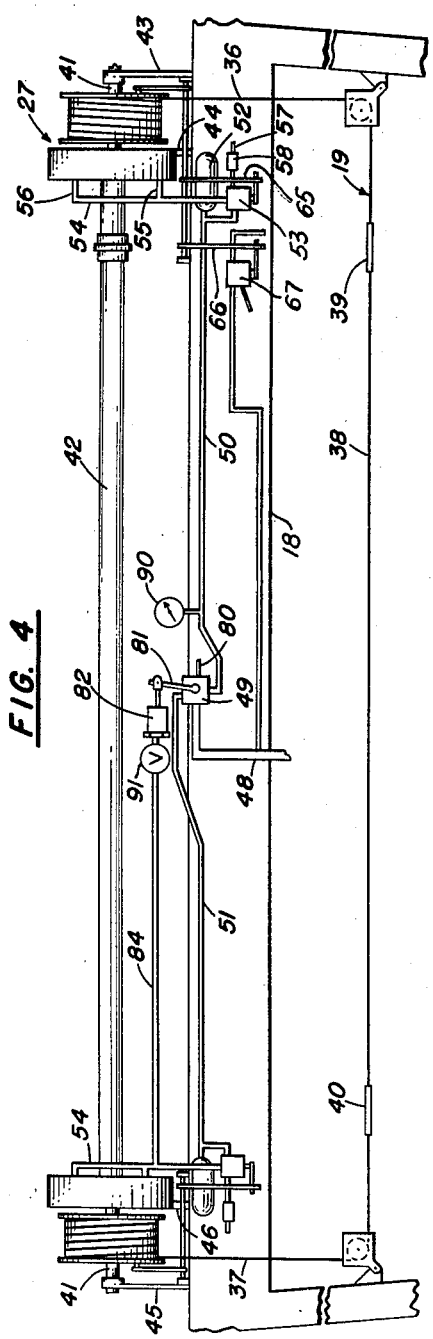

INVENTOR
JAMES GAMMACK

United States Patent Office 2,916,003
Patented Dec. 8, 1959

2,916,003

SEAPLANE BEACHING APPARATUS

James Gammack, Littleton, Colo., assignor, by mesne assignments, to the United States of America as represented by the Secretary of the Navy Application September 11, 1957, Serial No. 683,433

8 Claims. (Cl. 114—43.5)

This invention relates to a seaplane beaching apparatus which includes an automatic mechanism for arresting movement of seaplanes entering the beaching vehicle.

In beaching seaplanes use is made of beaching vehicles which are amphibious in that they are usable for seaplane carriage both on water and land. Vehicles of this type are provided with supporting wheels for land movement and with float chambers for water support, the plane being placed on the vehicle while in water and then both plane and vehicle moved as a unit over a beach exit.

Several problems arise in this type of craft such as the supply of adequate buoyancy, the provision of suitable plane supports, the development of power for the plane loaded vehicle and the like. One of the most important problems has to do with provisions of means for berthing the plane on the beaching vehicle without plane overriding, so that the combined unit may be taxied readily to the beach ramp and landing area in a manner similar to amphibious aircraft.

An important object of the invention, therefore, is to provide, in a beaching vehicle, mechanism for insuring proper mounting of a seaplane on the vehicle. A further object is to provide in a beaching vehicle means for progressively decelerating the movement of the plane relative to the vehicle in the mounting step while, simultaneously, permitting accelerated movement of the vehicle toward a velocity of equal value with the mounted unit. An object, also, is to provide mechanism in a beaching vehicle for increasing the relative speed of seaplane and vehicle without increase of motive power, under conditions where the plane fails to rest fully on the vehicle in a normal time interval.

Other objects and many of the attendant advantages of this invention will be readily appreciated as the same becomes better understood by reference to the following detailed description when considered in connection with the accompanying drawings wherein:

Fig. 1 is a schematic plan view of a seaplane about to enter the vehicle slip or cradle;

Fig. 2 is an elevational end view of the cable and brake drum showing the camming groove and cam follower lever for valve actuation;

Fig. 3 is a side view in elevation of the cable-brake drum showing the brake valve shaft and valve tripping mechanism;

Fig. 4 is a plan view of the fore end of the beaching vehicle showing the cable-brake drums with the connecting cable line and pneumatic pipe system and the included valve units;

Fig. 5 is a view of the time delay mechanism used for variable pressure reduction in the brake system;

Figure 7:
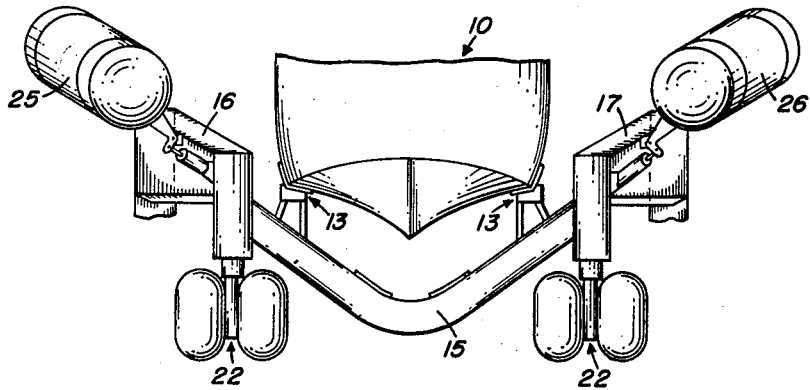
Fig. 7 is a rear view of a seaplane secured in the beaching apparatus.

In Fig. 1 is shown a seaplane 10 approaching the beaching vehicle 11 for berthing thereon. The beaching vehicle has a frame which is broadly rectangular in shape and of greater length than width. One end of the vehicle frame is closed by a cross beam 15 (Fig. 7) curved downwardly to permit the curved plane body to ride into position between the side beams 16 and 17, the opposite beam 18 being straight but also below the bottom plane of the side beams. Roller side bumpers 20 and 21 are mounted on the inward side of side beams 16 and 17 to assist in guiding the plane into full engagement with the vehicle berth. Shock pads 12 and support pads 13 and 14 are also provided so that, after full engagement of the plane with the support, the vehicle and plane may safely be transported as a unit, the plane supplying the motive power by its taxiing capability.

The vehicle is supported on land by two sets of wheels, each of the wheels 22 being castered to the frame at the frame corners and the wheels 23 and 24 being mounted on fixed shafts at the frame corners. Conventional braking devices are applied to each fixed shaft wheel and the controls are arranged so that, at will, braking force may be applied to either wheel. In this way, the direction of the vehicle while in motion may be changed as desired. In water, the vehicle is supported by two large buoyancy tanks 25, 26, one on either side of the vehicle frame and each extending approximately three-fourths of the over-all vehicle length. Mechanism is provided whereby these tanks may be alternately elevated or depressed as will hereinafter be described in more detail. When the vehicle is afloat, depression of the tanks raises the vehicle support pads 13 and 14 against the seaplane hull, and raising of the tanks permits separation of plane and vehicle.

In order to make a smooth mounting of the floating plane on the vehicle, there is employed a system of cables, valves and braking mechanism which will now be described. On the rear side of crossbeam 18 adjacent the ends of side beams 16 and 17 are positioned brake-drum units 27 and 28, unit 27 including the cable drum 29 and cable arresting brake 30 and unit 28, similarly, including the cable drum 31 and brake 32. The purpose of the brake-drum units is to provide means for arresting the forward movement of a berthing seaplane under the variable friction control of the brakes. To accomplish this result one end of a cable 19 is attached to the clamp 33 (Fig. 3) at the outer edge of the grooved peripheral surface of one of the drums, as at drum 29 and the other cable end, similarly, attached to the outer edge of the grooved peripheral surface of the other drum, flanges 34 serving to hold the cable on the drums.

From drum 29, the cable is extended along side beam 17 to cable pulley 35, swively mounted on the side beam at a point about one-half the side beam length and thence, transversely across the intra-beam space to a second swivelled cable pulley 36 mounted on side beam 16 and to the cable drum 31. The winding on the pulley drums is such as hold the cable taut, as it extends between the two side beams, the cable length wound on each drum being about the same and the length of the cable being such as to permit a twenty-five foot runout. Preferably, the cable is divided into three sections, the drum sections 36 and 37 (Fig. 4), and the cross section 38 connected to turnbuckles 39 and 40, which serve to place the proper tension on the cable. Since only the cable section 38 is subjected to the wear of the seaplane keel hook 99, the sectional arrangement of the cable permits replacements of the cross section without disturbance of the main cable sections.

The cable arresting brakes are placed in close proximity to the cable drums, the drum shaft 41 extending into the brake casing for connection to the braking elements therein. The brakes are interconnected by the supporting shaft 42 and brackets 43, 44 and 45, 46 support the brake and drum on the cross beam 18.

The drum brakes are preferably a disk opposing cylinder type, such as Goodyear "Industrial Disc Brakes," which are pneumatically operated through a pipe-line system to increase or decrease disk pressure. Each brake assembly consists of one disk and two sets of cylinders; and in order to obtain a 6100 pound cable load or a torque of 4400 foot pounds on a 17¼ inch diameter drum, a pneumatic pressure of 840 pounds per square inch is used. Part of the pipe system is shown in Fig. 4, there being a main pipe 48, connected to a pressurized tank, and distributing lines 50, 51. Pipe 50 connects to a pressure gage 90, an air bottle 52 for insuring fast brake actuation and to the three way valve 53. This valve has one connection through manifold 54 and supply pipes 55 and 56 to the brake cylinders and another connection to the vent 57 through check valve 58. To operate this valve 53, the outer face of the cable drum is formed with a spiral cam groove 60 (Fig. 2) and a lever arm 61, carrying at its free end a cam follower 69, is fixed to a shaft 63 which is mounted for rotational movement in brackets 62 and 64 fixed to the beam structure, this movement being in a plane parallel to the drum surface. It is apparent from inspection of Fig. 2, that counter-clockwise rotation of the drum will cause the lever arm 61 to pivot to the right, and by this pivotal movement the shaft 63, on which the lever arm is fixedly mounted, is caused to rotate, thereby initiating secondary movements which will now be described.

Figure 6:
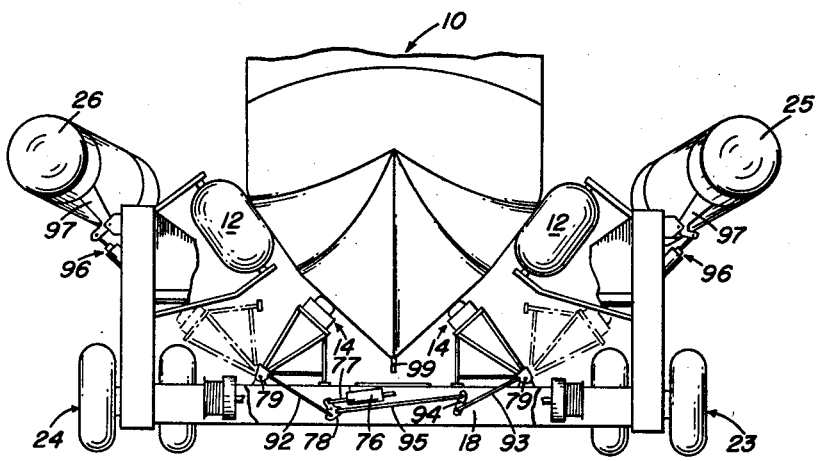
Fig. 6 is a front view of a seaplane secured in the beaching apparatus.

Fixed at spaced points on the shaft 63 are valve tripping cams 65 and 66, cam 65 operating, shortly after the drum moment starts, to open the brake line valves 53, and cam 66 operating, toward the end of the cable runout, to open pad lifting valve 67. As valve 67 is opened, pressure enters cylinder 76 (Fig. 6) to move piston rod 77 to the left, the piston rod being connected to one arm of a bell crank 78 which is pivotally mounted on cross beam 18. The support pads 14 are pivotally mounted on the cross beam 18 by members 79 in a normally outboard position, the left support pad being connected to a second arm of the bell crank by link 92, and the right support pad being connected to a third arm of the bell crank by means of link 93 which is attached to one end of a centrally pivoted arm 94 and link 95 which is attached to the other end of arm 94 and to crank 78. It will be apparent that the opening of valve 67 will cause the pads 14 to be moved under the hull of the seaplane; and that movement of the piston rod 77 in the opposite direction will cause the pads to move to an outboard position so that the seaplane can be disengaged from the beaching apparatus. The piston rod 77 extends through the rear of cylinder 76 and is in engagement with a valve (not shown) which admits fluid pressure to the piston-cylinder units 96 connected to the bell cranks 97 which pivotally support the buoyancy tanks 25 and 26 on the vehicle frame. When the pads 14 reach their final or inboard position, a valve is opened by the rearwardly extending end of piston rod 77 to cause the buoyancy tanks to be forced underwater by means of the piston-cylinder arrangements whereby the beaching apparatus is raised with support pads 13 and 14 contacting the seaplane hull. In this condition, the plane and beaching apparatus may be safely transported as a unit. The wheel brake system of the vehicle is then manually connected by any conventional means to the brake system of the seaplane.

At the start of the berthing movement and before actuation of the braking valves by cam 65, a camming arm 68 is rotated by the drum shaft 41 to actuate releasing mechanism for the vehicle anchoring device.

Referring again to the braking mechanism for the cable drums and the camming means for initiating the braking action, the curve of cam groove 60, beginning at the outer end 70, forms a circular arc to point 71 where the radius is abruptly reduced and a uniform spiral action commenced, this spiral curvature having a sharp change of radius at point 72 near the end of the drum movement to actuate the pad lifting valve 67. The purpose of the initial circular movement of the cam between points 70 and 71 is to overcome the large static friction of the disk brake before pressure is applied by the valving action of valve cam 65 induced by the spiral cam movement beginning at point 71. A positive stop for preventing override of the drum when the cable completes its runout is provided in a radial stop 73 on the drum periphery, so mounted as to engage the end of slave arm 74 at the end of the cable runout. This arm 74 is pivotally mounted on crossbeam bracket 62 at a point displaced outwardly, with reference to drum 29, but adjacent the pivot point of lower arm 61. The two arms 61 and 74 are permanently joined by the pivoting link 75.

In the normal operation of the equipment, the seaplane taxis to the anchored vehicle and enters the inlet end thereof between side beams 16 and 17, the keel hook 99 catching the cable in its berthing movement. The initial free rotation of the cable drum actuates the anchor release lever 68 and permits release of the brake disks from static friction. At point 71 of cam groove 60 lever arm 61 begins its pivotal movement to open valve 53, thereby applying pressure to the brakes and causing the vehicle to move with accelerated velocity while the seaplane decelerates. At the end of the runout both plane and vehicle will be moving at the same speed. At the end point, also, as previously mentioned, the cam groove 60 triggers the pad lifting valve 67 which moves the support pads into position, the buoyancy tanks are submerged applying the pads to the plane hull, brake connections are made between the vehicle wheel brakes and the brake system of the plane, and the loaded vehicle taxied to the landing port. With an entry speed of 10 knots, a weight of 160,000 pounds for the seaplane and a 25,000 pound weight for the vehicle, equal speed for plane and vehicle should obtain at full cable runout. However, should there be divergence from these figures, as a lower weight or speed of the plane, the cable drum will stop feeding before the plane is properly berthed; and to remedy this situation it would be necessary to increase the plane speed to a point where the cable load would break the static resistance of the brake. To overcome this difficulty, the pressure in the cable brakes is reduced automatically when the plane and vehicle reach a common speed before full cable runout.

The mechanism for reducing the cable brake pressure is included in valve 49 which comprises two main outlets to pipe lines 50 and 51 and an outlet through vent 80 for pressure reduction. The valve arm 81 for opening the vent is operated automatically by a time delay mechanism 82, as shown in Fig. 5; which includes a hollow closed cylinder 98 having a screw cap 83 at one end, both the screw cap and the opposite end being apertured, the cap aperture forming a pipe connection from the cable brake pressure line 54 through pipe 84, and the opposite cylinder aperture forming the opening for the rod 85 of a piston 86 slidable within the cylinder. Coiled spring 87 extends the length of the cylinder between the piston and opposite cylinder end to hold the piston normally against the internal annular flange 88 formed on the cap. Opening 89 are formed in the piston. The external end of piston rod 85 is connected adjustably to the end of valve arm 81. Connected between the time delay cylinder 98 and the brake manifold 54 is a needle valve 91 for modifying the rate of gas flow into the time delay cylinder.

The time delay unit functions as follows. The needle valve is adjusted so that the rate of gas flow to the time delay cylinder will be insufficient to actuate the vent valve during the normal time period of seaplane positioning in the vehicle. Should the plane fail to berth properly, however, within the normal time period, pressure, which is building up in the time delay cylinder, reaches a value sufficient to overcome the spring and the piston moves outwardly, venting gas to the atmosphere and reducing pipe line pressures in the cable brakes to a point where slippage develops. The plane then carries the cable to full runout in a completely berthed position.

A pneumatic brake pressure control system is described in the specification, but it should be understood, that other control systems, such as electromagnetic may be used.

Obviously many modifications and variations of the present invention are possible in the light of the above teachings. It is therefore to be understood that within the scope of the appended claims the invention may be practiced otherwise than as specifically described.

What is claimed is:

1. In a seaplane beaching vehicle, apparatus for positioning a seaplane provided with a keel hook in transport position on said vehicle, comprising a vehicle frame having forward and rearward ends, means attached to said frame for supporting said frame on land, means attached to said frame for supporting said frame in water, means connected to said frame for supporting said seaplane on said frame, and means for reducing relative motion between said seaplane and frame to zero when said plane is moved into complete support position on said vehicle, said relative motion reducing means comprising a cable placed across said vehicle in the path of plane berthing movement for engagement by the keel hook of said seaplane, cable drums rotatably mounted on said frame for attachment to and winding of the ends of said cable, a brake for each of said drums, and brake actuating means associated with each of said drums and connected to the brakes for actuating each of said brakes only after engagement of the seaplane keel hook and cable and after a partial rotation of said cable drums.

2. The apparatus as defined in claim 1, each of said brake actuating means comprising a continuous cam groove formed on the outside face of the cable drum, a cam follower in said groove, a fixed lever arm pivot support means on said forward end, a shaft rotatably mounted by said support means, a lever arm fixedly mounted on said shaft and attached at its free end to said cam follower, valve means mounted on said forward end and connected to the brake, and valve tripping cam means fixed to said shaft and operably associated with said valve means whereby the brake will be actuated at a predetermined angular position of said lever arm, shaft and valve tripping cam means.

3. The apparatus as defined in claim 2 and means connected to said support means and each of said drums for preventing runover of said cable drums by said cable.

4. The apparatus as defined in claim 2, said cable drum runover prevention means for each drum comprising a projecting stop on said drum and a mating stop pivotally connected to said pivot support means and lever arm.

5. The apparatus as defined in claim 2, with said continuous cam groove consisting of an outer initial circular grooved section and a following internally directed spiral grooved section, whereby the lever arm is held from angular movement during the initial rotational period of said drum.

6. In a seaplane beaching vehicle, apparatus for positioning a seaplane provided with a keel hook in transport position on said vehicle, comprising a vehicle frame having forward and rearward ends, means attached to said frame for supporting said frame on land, means attached to said frame for supporting said frame in water, means connected to said frame for supporting said seaplane on said frame, and means for reducing relative motion between said seaplane and frame to zero when said plane is moved into complete support position on said vehicle, said relative motion reducing means comprising a cable placed across said vehicle in the path of plane berthing movement for engagement by the keel hook of said seaplane, cable drums rotatably mounted at the forward end of said frame at opposite sides thereof for attachment to and winding of the ends of said cable, a brake for each of said drums, brake actuating means associated with each of said drums and connected to the brakes for actuating each of said brakes only after engagement of the seaplane keel hook and cable and after a partial rotation of said cable drums, and means connected to each brake for reducing automatically the braking pressure of said brakes when the relative motion of seaplane and vehicle becomes zero prior to complete berthing position of said seaplane and vehicle.

7. The apparatus as defined in claim 6, said braking pressure reducing means comprising a pressure-responsive time delay unit mounted on said frame for reducing the brake pressure after a predetermined time.

8. In a seaplane beaching vehicle, apparatus for positioning a seaplane provided with a keel hook in transport position on said vehicle, comprising a vehicle frame having forward and rearward ends, means attached to said frame for supporting said frame on land, means attached to said frame for supporting said frame in water, means connected to said frame for supporting said seaplane on said frame, and means for reducing relative motion between said seaplane and frame to zero when said plane is moved into complete support position on said vehicle, said relative motion reducing means comprising a cable placed across said vehicle in the path of plane berthing movement for engagement by the keel hook of said seaplane, cable drums rotatably mounted at the forward end of said frame at opposite sides thereof for attachement to and winding of the ends of said cable, a pneumatic brake for each of said drums, brake actuating means associated with each drum and connected to said brakes for actuating each of said brakes only after engagement of the seaplane keel hook and cable and partial rotation of said drums, said brake actuating means including a pipe line connected to said brakes for introducing pneumatic braking pressure and means for reducing automatically the braking pressure of said brakes when the relative motion of seaplane and vehicle becomes zero prior to complete berthing position of said seaplane and vehicle, said pressure reducing means including a vent valve connected to the pipe line to reduce line pressure, a lever arm for actuating said valve, a time delay unit including a closed cylinder connected to the pipe line between the valve and said brakes, a piston movable in said cylinder, a piston rod connecting said piston and vent valve lever arm, and a needle valve in said pipe line between the cylinder and said brakes for adjusting the pressure in said cylinder and thereby the time delay of said vent valve.

References Cited in the file of this patent

UNITED STATES PATENTS

| | | |
|---|---|---|
| 1,806,992 | Fieux | May 26, 1931 |
| 1,937,973 | Mayo | Dec. 5, 1933 |
| 2,434,618 | Kerr | Jan. 13, 1948 |
| 2,473,397 | Slavin | June 14, 1949 |
| 2,501,310 | Burke | Mar. 21, 1950 |
| 2,756,712 | Harris | July 31, 1956 |